June 27, 1944.    R. W. POINTER    2,352,446
SPRING SUPPORT FOR MOTOR VEHICLE
Filed Sept. 23, 1941    2 Sheets-Sheet 1
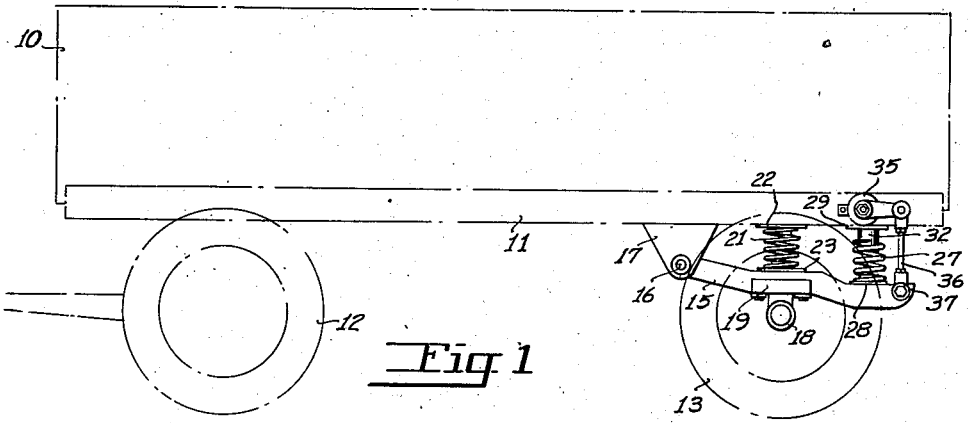
Fig 1
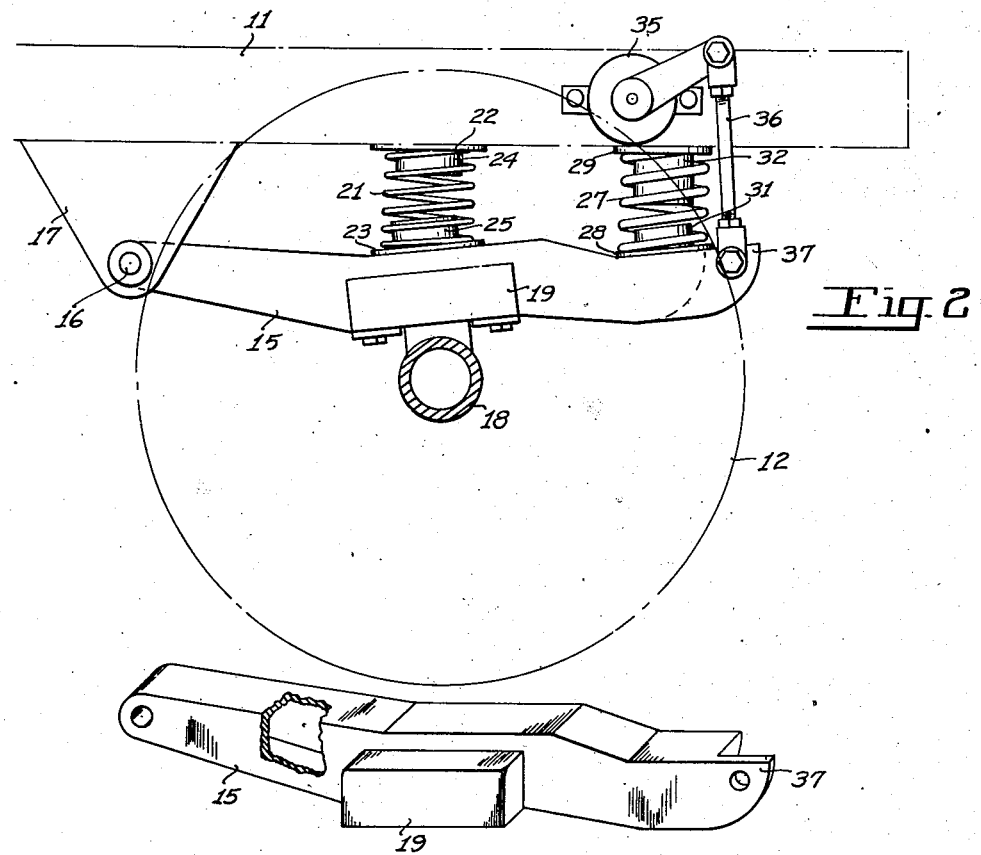
Fig 2
Fig 3
ROBERT W. POINTER
INVENTOR.
BY
ATTORNEY June 27, 1944.　　　R. W. POINTER　　　2,352,446
SPRING SUPPORT FOR MOTOR VEHICLE
Filed Sept. 23, 1941　　2 Sheets-Sheet 2
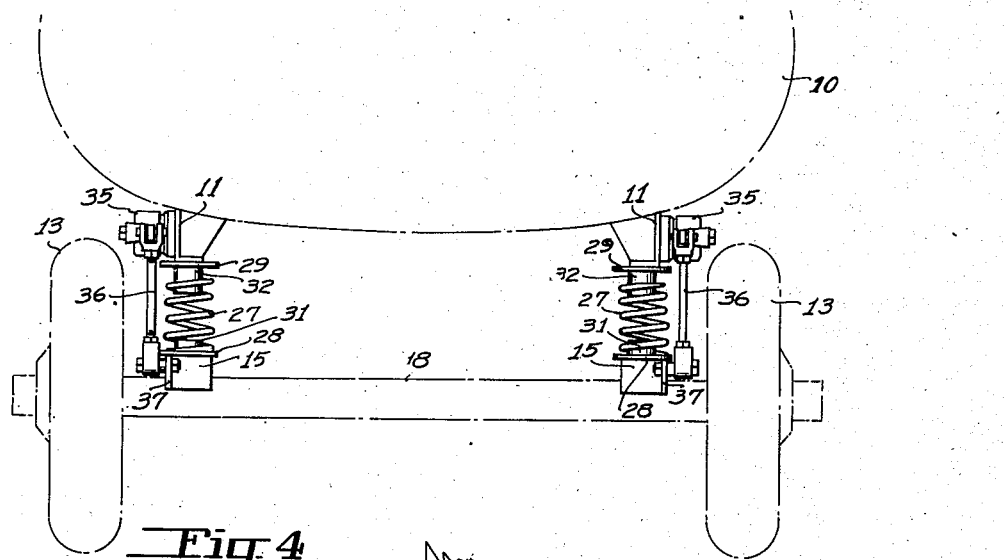
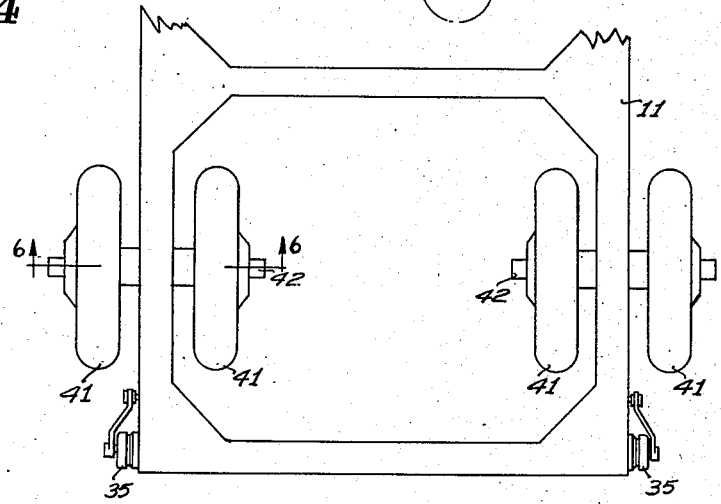
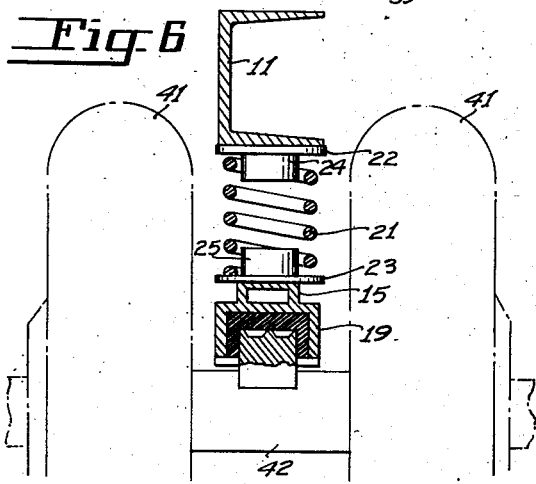
ROBERT W. POINTER
INVENTOR.
ATTORNEY Patented June 27, 1944

2,352,446

UNITED STATES PATENT OFFICE 2,352,446

SPRING SUPPORT FOR MOTOR VEHICLES

Robert W. Pointer, Portland, Oreg.

Application September 23, 1941, Serial No. 411,954

7 Claims. (Cl. 267—20)

The present invention relates to spring supports for motor vehicles, and, while it is not necessarily limited thereto, it is particularly applicable for mounting the wheels of truck and trailer vehicles.

Certain types of vehicles such as trucks are subject to a great differential in weight between the empty and full load conditions. Generally, the spring supporting structure for such vehicles is designed to provide a relatively smooth ride for the fully loaded vehicle. Accordingly, the springs of such structures are relatively stiff, and, when the vehicle is empty or only lightly loaded, the springs are substantially ineffective for absorbing road shocks, with the result that the mechanical structure of the vehicle is subjected to severe vibrations. This is particularly true in the case of vehicles of such types as tank trucks and tank trailers, since excessive vibrations are apt to cause loosening of the tank seams or crystallization and breakage of the tank mooring means. Such vehicles are empty or lightly loaded approximately one-half of the time, as when returning from the point of delivery, and the severity of road shocks is considerably increased at such times, due to the fact that when empty the vehicles usually are driven at higher rates of speed than when fully loaded. Unless provision is made in the spring suspension arrangement for properly cushioning the vehicle against road shocks when traveling light, the vehicle structure is apt to be literally shaken apart.

It is, therefore, an object of the present invention to provide a new and improved spring supporting arrangement for motor vehicles which will provide adequate cushioning of road shocks under both light and heavy load conditions.

It is a further object of the invention to provide a spring support for motor vehicles so constructed and arranged that side sway of the vehicle when negotiating curves, and, consequently, much tire wear, is eliminated.

It is a further object of the invention to provide a novel spring support for motor vehicles, and particularly for trucks and trailers, which is of a relatively simple construction, comprising relatively few parts, and which is economical of manufacture.

In accordance with an illustrated embodiment of the invention, a lever arm extends longitudinally beneath each side of the vehicle frame and is pivotally connected thereto for movement in the vertical plane of the side frame member. A shaft for the vehicle wheels is mounted upon the lever intermediate its ends. A first, relatively light, coil spring is arranged between the lever and the frame and is effective for supporting and providing adequate cushioning for the vehicle when empty or only lightly loaded. A second coil spring, also arranged between the lever and the vehicle frame, is of a relatively heavy size and is capable of supporting the vehicle and providing adequate cushioning of road shocks therefor when fully loaded. The second spring is so mounted that it is normally unstressed during the light load condition of the vehicle, but upon application of full load thereto the heavy spring becomes effective in parallel relation with the first spring. A shock absorber is further connected between the lever arm and the vehicle frame for dampening the rebound.

For a consideration of what is believed novel and inventive, attention is directed to the following description and the claims appended thereto, taken in connection with the accompanying drawings, while the features of novelty will be pointed out with greater particularity in the appended claims.

In the drawings, Figure 1 is an outline sketch illustrating a truck type trailer having a pair of rear wheels supported by a suspension structure according to the present invention; Figure 2 is an enlarged view of the suspension structure illustrating the relative position of parts during a fully loaded condition of the vehicle; Figure 3 is a view in perspective, a part thereof being broken away, illustrating in further detail the construction for the lever arm of the supporting arrangement; Figure 4 is a rear view of the trailer shown in Figure 1; Figure 5 is a plan view of a portion of a vehicle framework having pairs of tandem wheels mounted thereon with a suspension structure according to a modification of the invention; and Figure 6 is a view taken along the line 6—6 of Figure 5.

Referring to the drawings, the numeral 10 indicates a truck type trailer vehicle having a main frame comprising side members 11, forward wheels 12, and rear wheels 13. The rear wheels 13 in this instance are mounted on the vehicle with a spring supporting arrangement constructed in accordance with one form of the present invention. As shown more clearly in Figure 2, the supporting arrangement comprises a relatively rugged lever arm 15 which is pivotally mounted as at 16 upon the bracket 17 depending from the side frame member 11. The lever arm 15 extends longitudinally beneath the side frame member 11 and is pivotally movable about the point 16 in the vertical plane of the frame member 11. The lever arm 15 may be of any suitable construction; for example, as shown in Figure 3, it may be of box shaped cross section for imparting requisite strength and rigidity thereto. The lever arm is relatively wide, particularly at its forward end through which the pivot pin extends, so that the pivotal connection will permit of substantially no lateral movement of the lever arm.

The wheel shaft 18 is resiliently mounted upon the lever arm 15 intermediate the ends of the latter, the shaft extending transversely with respect thereto. While it is not essential to the practice of the present invention, it is preferred to mount the shaft upon the lever arm in a manner disclosed in my Patent No. 2,238,002, issued April 8, 1941, for Cushion seat for trailer axles. For this purpose, the arm is provided with an integral inverted box-like housing 19 for cooperatively receiving a cushion mount.

A first, relatively light spring 21 is arranged between the vehicle frame member 11 and the lever arm 15 above the shaft 18. The opposite ends of the spring 21 engage with the cooperating seats 22 and 23 secured to the facing surfaces of the frame member 11 and the lever arm 15, respectively. Suitably secured to the outer surfaces of the seats 22 and 23 are round blocks 24 and 25, respectively, which extend concentrically within the corresponding ends of the spring 21 so as to retain the spring in place. These blocks may be of a resilient material such as rubber so that they will act as buffers to prevent direct metallic contact between the two relatively movable parts, as when the wheel suddenly passes over an obstruction.

A relatively heavy second spring 27 is mounted upon the arm 15 on the opposite side of the first spring 21 as regards the pivot 16, and which spring 27 extends between the lever arm 15 and the frame 11 in parallel relation with the first spring 21. Seats 28 and 29 for the opposite ends of the spring 27 are provided on the lever arm 15 and the frame member 11, respectively, cylindrical blocks 31 and 32 being suitably secured to the facing surfaces thereof and which extend concentrically into the opposite ends of the spring 27 for retaining the latter spring in place. The spring 27 is of such a length as regards the length of spring 21 so that during the empty condition of the vehicle or during the extremely light load condition thereof, the upper end of the spring 27 is spaced from the upper seat 29. Thus, during the empty or light loaded condition of the vehicle the relatively light spring 21 is solely effective in supporting the weight of the vehicle and for cushioning the road shocks which may be transmitted thereto. Upon the application of full load to the vehicle, the relatively light spring 21 will be compressed to such an extent as to allow the upper seat 29 to engage with the upper end of the heavier spring 27. It will be observed that the upper block 32 is of a length greater than the spacing between the seat 29 and the upper end of the spring 27 so that it projects thereinto during the empty condition of the vehicle and guides the upper end of the spring 27 into proper seating relation with the seat 29 as the vehicle is loaded. Thus, during the fully loaded condition of the vehicle, the two springs 21 and 27 are effective in parallel relation for supporting the weight, spring 27 being so selected that, when acting in conjunction with spring 21, the road shocks are smoothly cushioned. Blocks 31 and 32, and particularly the latter, may be of a resilient material such as rubber, if desired, so that they may act as buffers in the event spring 27 is compressed to the extent that these blocks contact with each other.

For checking the rebound of the vehicle frame following passage over a surface irregularity in the roadway, a suitable shock absorber 35 including a link 36 is connected between the vehicle frame 11 and an outer extremity 37 of the lever arm 15. It will be observed that the point of connection of the shock absorber to the arm is thus considerably removed from the shaft 18 so that a relatively small shock absorber acting through the long lever arm will provide adequate snubbing of the relative movements between the arm 15 and the vehicle frame. In this latter regard, it will be observed that the heavy load spring 27 also is arranged preferably toward the end of the lever arm 15 whereby the use of a considerably lighter spring is permissible than if it were arranged closer to the shaft. In the position shown the shock absorber 35 is also effective to prevent side sway of the vehicle when negotiating curves. The snubbing of the movement between the arm 15 and the vehicle frame holds the frame level and skidding transversely of the roadway is largely overcome. The shock absorber also ties the arm 15 to the vehicle frame to prevent excessive separation therebetween, and thereby precludes the possibility of the springs 21 and 27 becoming dislodged during the period of rebound.

It will readily be understood that the relative position of the springs 21 and 27 may be reversed if desired, that is, the long, light load spring 21 may be arranged at the end of the arm 15 and the shorter heavy load spring 27 arranged above the shaft. Such an arrangement might be preferred when the weight differential between the empty and fully loaded condition of the truck is considerably less than in the case first assumed.

With the springs mounted as described, it will be obvious that other springs of any desired degree of stiffness may readily be substituted for those in place in order to adapt the vehicle chassis for any particular type of body or classification of loading. The springs are loosely mounted, being retained in position merely by the cylindrical blocks extending outwardly from the seats and concentrically within the opposite ends of the springs. To change springs, it is merely necessary to disconnect the shock absorber link 36 and jack up the vehicle frame to cause the arm 15 to pivot downwardly sufficient to permit the springs to be lifted off of the seats and others to be substituted therefor. No special skill, tools, or shop equipment is necessary to effect such a simple change. Furthermore, the change may be performed within a very short period of time.

As illustrated in Figures 1 to 4, inclusive, the pair of rear wheels 13 are mounted upon a single shaft 18, while the vehicle is mounted upon the one shaft by means of a pair of similar spring supporting structures. The spring supporting structures, as described, are also suitable for mounting the vehicle frame upon dual wheel units as illustrated in Figures 5 and 6. In this instance, the pairs of dual wheels 41 are mounted in a spaced relation upon individual short shafts 42. The lever arms 15 are in turn suitably mounted upon the shafts 42 between the wheels 41, as by a cushion mount further described in the above mentioned patent. The pivotal connection 16 with the side frame members 11 is sufficiently rugged as to amply withstand any relative side thrusts between the undercarriage and the vehicle framework.

It will be apparent that the spring supporting arrangement as described is effective in providing adequate cushioning of road shocks for all conditions of load, and thus is particularly suitable for use on such vehicles having superstructures which are inherently incapable of withstanding severe vibrations.

Having described my invention in what I consider to be a preferred embodiment, I desire to have it understood that the structural details shown are merely illustrative, and that the invention may be carried out in other ways.

I claim:

1. In a vehicle, a main frame member, a lever arm pivotally secured at one end to said member and extending longitudinally therebeneath, a shaft mounted transversely on said arm intermediate its ends, a coil spring arranged between said arm and said member above said shaft and normally under compression therebetween, a second coil spring mounted on the end of said arm on the opposite side of said first coil spring with respect to said pivotal connection, said second coil spring being unstressed during light vehicle load conditions and adapted to be compressed between said arm and said frame member during normal heavily loaded vehicle conditions, and a shock absorber connecting the outer end of said arm and said frame member.

2. In a vehicle, a main frame member, a lever arm pivotally connected at one end to said member and extending longitudinally therebeneath, said pivotal connection permitting movement of said arm in the vertical plane of said frame member and substantially precluding movements of said arm in a horizontal direction, a shaft mounted on said arm intermediate its ends, a relatively light coil spring arranged between said arm and said member and normally under compression therebetween, a second coil spring mounted on said arm on the opposite side of said first coil spring with respect to said pivotal connection, said second coil spring being spaced from said member and unstressed during light vehicle load conditions and adapted to engage with said frame member during normal heavily loaded vehicle conditions, and a shock absorber connecting the end of said arm and said frame member remote from said pivotal connection.

3. In a vehicle, a main frame member, a lever arm pivotally connected at one end to said frame member and extending longitudinally therebeneath, a shaft mounted on said arm intermediate its ends, a first, relatively light coil spring arranged between said arm and said member and under compression therebetween, a second, relatively heavy coil spring mounted on said arm on the opposite side of said first coil spring with respect to said pivotal connection, the upper end of said second coil spring being spaced from said vehicle frame member during light vehicle load conditions and adapted to be compressed between said frame member and said arm during heavily loaded vehicle conditions, and means secured to said frame member extending downwardly a relatively short distance into the upper end of said second coil spring for guiding said second spring into engagement with said frame member during heavily loaded vehicle conditions.

4. In a vehicle, a main frame member, a lever arm pivotally connected at one end to said frame member and extending longitudinally therebeneath, a shaft mounted transversely of said arm intermediate its ends, a first coil spring arranged between said arm and said member and normally under compression therebetween, a second coil spring mounted on said arm on the opposite side of said first coil spring with respect to said pivotal connection, the upper end of said second coil spring being spaced from said vehicle frame member during light vehicle load conditions and adapted to be compressed between said frame member and said arm during heavily loaded vehicle conditions, and means including a buffer member secured to said frame member extending downwardly concentrically within said second coil spring.

5. In a vehicle, a main frame member, a lever arm pivotally secured at one end to said frame member and extending longitudinally therebeneath, a shaft mounted transversely of said arm intermediate its ends, a coil spring arranged between said arm and said member and under compression therebetween, a second coil spring mounted on said arm on the opposite side of said first coil spring with respect to said pivotal connection, the upper end of said second spring being spaced from said member during light vehicle load conditions and adapted to be compressed between said frame member and said arm during heavily loaded vehicle conditions, and means comprising a resilient buffer member secured to said frame member and extending downwardly therefrom concentrically within said second spring during light vehicle load conditions, and a second buffer member secured to said arm within said second coil spring adapted to engage with said first buffer member and for retaining said second spring upon said arm.

6. In a vehicle, a main frame member, a lever arm pivotally connected at one end to said frame member and extending longitudinally therebeneath, a wheel shaft mounted on said arm intermediate its ends, a first relatively light coil spring arranged between said arm and said member and normally compressed by said arm and member, a second relatively heavy coil spring mounted on said arm on the opposite side of said first coil spring with respect to said pivotal connection, the upper end of said second spring being spaced from said frame member during light vehicle load conditions and adapted to be compressed between said frame member and said arm during heavily loaded vehicle conditions, a seat for the upper end of said second spring secured to said frame member, and buffer blocks secured to the facing surfaces of said frame member and said arm and extending into the opposite ends of said second spring for retaining said spring in place and for guiding the upper end of said second spring onto said said seat upon the application of full load to said vehicle.

7. In a vehicle, a main frame member, a lever arm pivotally connected at one end to said frame member and extending longitudinally therebeneath, a shaft mounted transversely of said arm intermediate its ends, a first coil spring arranged between said arm and said member, seats on said member and said arm for the opposite ends of said first coil spring, means secured to said seats for loosely retaining said first coil spring on said seats, said first coil spring being held under compression between said seats, a second relatively heavy coil spring mounted between said arm and said frame member and spaced from said first coil spring, seats for said second coil spring on said frame member and said arm, one end of said second coil spring being spaced from the corresponding one of said seats during light vehicle load conditions, means secured relative to said one seat for guiding said spaced end of said second coil spring onto said one seat upon application of full load to said vehicle and loosely retaining said second spring upon the opposite of said seats, and means including a shock absorber connecting the end of said arm opposite said pivotal connection to said frame member.

ROBERT W. POINTER.